United States Patent [19]

Weidner et al.

[11] Patent Number: 5,425,610

[45] Date of Patent: Jun. 20, 1995

[54] METAL PLATE WITH A SCREW BORE

[75] Inventors: Hans-Jürgen Weidner, Winkelhaid; Franz Scheuermann, Nuremberg; Karlheinz Kind, Eckental, all of Germany

[73] Assignee: U.S. Philips Corporation, New York, N.Y.

[21] Appl. No.: 247,935

[22] Filed: May 24, 1994

[30] Foreign Application Priority Data

Jun. 3, 1993 [DE] Germany ............... 43 18 421.9

[51] Int. Cl.⁶ .................... F16B 37/00; F16B 37/16
[52] U.S. Cl. .................... 411/437; 411/104; 411/918; 470/26
[58] Field of Search ............ 411/104, 427, 436, 437, 411/918; 470/25, 26

[56] References Cited

U.S. PATENT DOCUMENTS 2,818,764  1/1958  Switzer ........................ 411/437
2,969,549  1/1961  Mills .......................... 411/437 X
3,006,231 10/1961  Kahn ........................... 411/437 X

FOREIGN PATENT DOCUMENTS 0624404  1/1936  Germany .
810545   8/1951  Germany ....................... 411/437

Primary Examiner—Neill R. Wilson
Attorney, Agent, or Firm—Paul R. Miller

[57] ABSTRACT

The invention relates to a metal plate (10) with a screw bore (16) starting at one narrow side of the plate and running parallel to the plate surfaces (10a,b), which screw bore (16) is formed in a simple manner in that first recesses, for example through holes (11), are provided and subsequently the metal portions (13) formed between the recesses (11) are alternately stamped in the direction of the one and the other plate surface (10a, 10b), such that the outer surfaces (14a, 15a) of the stamped parts lie flush with the relevant plate surfaces (10a, 10b).

4 Claims, 1 Drawing Sheet

METAL PLATE WITH A SCREW BORE

BACKGROUND OF THE INVENTION

The invention relates to a metal plate with a screw bore which enters one side face of the metal plate and runs parallel to the plate surfaces. The invention further relates to a method of manufacturing such a screw bore.

DE-PS 624 404 discloses a metal plate with such a screw bore. This relates to a device for screwing a metal plate to a surface perpendicular thereto, which metal plate rests on the surface with an end face corresponding to the plate thickness only. A screw bore with a basic thread in the metal plate is created in that the plate is given multiple incisions and the metal strips situated between the incisions are so bent from the plate surface that a channel consisting of half walls is created into which half threads are cut. The bent-out metal strips in this case project beyond the relevant surfaces of the metal plate.

SUMMARY OF THE INVENTION

The invention has for its object to provide a metal plate with a screw bore of the kind mentioned in the opening paragraph without portions of the metal projecting from the surfaces in the region of the screw bore.

According to the invention, this object is achieved in that the screw bore is formed from metal portions situated between recesses, which portions are stamped alternately in the direction of the one and the other plate surface and whose outer surfaces He flush with the relevant metal plate surfaces. The screw bore formed in this manner serves to accommodate a threaded screw or a self-tapping screw. Owing to the stamping operation, the relevant metal portions are reinforced, while the outer surfaces of the reinforced portions lie flush with the relevant surfaces of the metal plate.

A simple method of manufacturing a metal plate of the kind mentioned in the opening paragraph comprising a screw bore is characterized in that
  a) the metal plate is provided with recesses from one side of the plate in the region of the envisaged screw bore such that metal portions remain between the recesses, and
  b) the remaining metal portions are alternately stamped in the direction of the one and of the other metal plate surface such that their outer surfaces lie flush with the relevant metal plate surfaces.

These recesses are all equally large and arranged at equal distances from one another. They may be manufactured in a simple manner, for example, by punching, while said metal portions remain between the punched recesses and are stamped in the direction of the one or the other plate surface, and thus reinforced, in a second process step. During the stamping process, part of the material presses itself into the recesses.

A preferred embodiment of the method mentioned above is characterized in that the recesses are provided in the form of through holes lying in one line, the bridges remaining between the through holes being stamped and thus reinforced in a second process step, as explained above.

A further embodiment of the invention is characterized in that the circular through holes are so arranged that the centre of the first hole lies on the edge of the metal plate. It can be achieved thereby that the material of the first bridge will not project from the edge of the metal plate upon stamping.

BRIEF DESCRIPTION OF THE DRAWINGS

In the drawing, FIGS. 1 to 4 diagrammatically show an embodiment of the subject of the invention.

DETAILED DESCRIPTION OF THE PREFERRED EMBODIMENT

Figure 1:
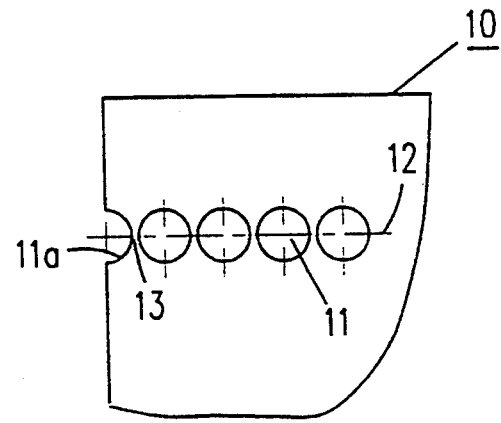
FIG. 1 shows a portion of a metal plate with circular through holes before stamping.
Figure 2:
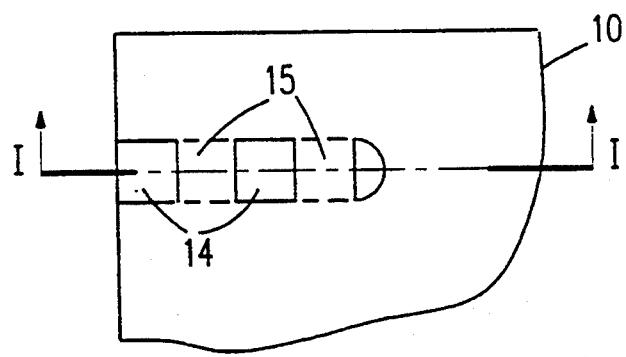
FIG. 2 shows the metal plate after stamping.
Figure 3:
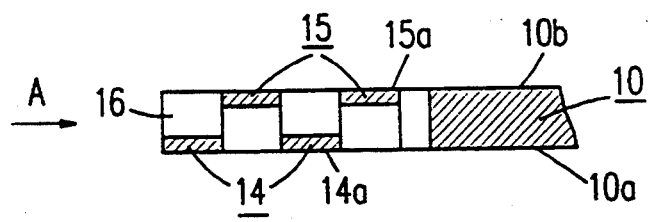
FIG. 3 is a cross-section taken on I—I in FIG. 2.
Figure 4:
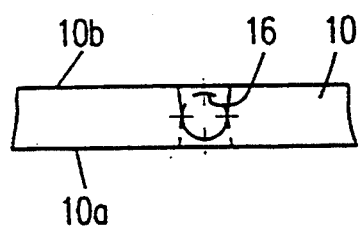
FIG. 4 is an elevation seen in direction A in FIG. 3.

Reference numeral 10 denotes a metal plate which is provided with through holes 11 lying next to one another in the region of a screw bore to be manufactured. The holes 11 are all in one straight line 12 and are so arranged that the centre of the first hole lies on the edge, so that only a semicircular hole 11a is formed here. Bridges 13 remain between the holes and are stamped in the direction of the one or the other metal plate surface 10a, 10b in a next process step. During stamping, the material of the bridges 13 present between the holes 11 is reinforced and at the same time partly moves away into the spaces vacated by the holes 11. FIG. 3 shows the metal portions stamped in the direction of the plate surface 10a and reinforced with reference numeral 14 and the metal portions stamped in the direction of the plate surface 10b and reinforced with reference numeral 15. A screw bore has been created between the reinforced portions 14, 15 thus formed into which, for example, a self-tapping screw may be turned which cuts its own screwthread. It is alternatively possible, however, to provide this screw bore 16 with its own screwthread for a screw to be inserted subsequently.

We claim:
1. A metal plate (10) with a screw bore (16) which enters one side face of the metal plate and runs parallel to the plate surfaces (10a, b), characterized in that the screw bore (16) is formed from metal portions (13) situated between recesses (11), which portions are stamped alternately in the direction of the one and the other plate surface (10a, b) and whose outer surfaces (14a, 15a) lie flush with the relevant metal plate surfaces (10a, 10b).

2. A method of manufacturing a metal plate (10) with a screw bore (16) characterized in that
  a) the metal plate (10) is provided with recesses (11) from one side of the plate in the region of the envisaged screw bore such that metal portions (13) remain between the recesses (11), and
  b) the remaining metal portions (13) are alternately stamped in the direction of the one (10a) and of the other (10b) metal plate surface such that their outer surfaces (14a, 15a) lie flush with the relevant metal plate surfaces (10a, 10b).

3. A method as claimed in claim 2, characterized in that the recesses are provided in the form of through holes (13) lying in one straight line (12), between which holes bridges (13) remain as the metal portions.

4. A method as claimed in claim 3, characterized in that the circular through holes (11) are so arranged that the centre of the first hole (11a) lies on the edge of the metal plate (10).

* * * * *